United States Patent
Seiler et al.

(10) Patent No.: US 7,236,977 B1
(45) Date of Patent: Jun. 26, 2007

(54) METHOD FOR DYNAMICALLY DISTRIBUTING ITEMS FOR CHANGES BASED ON GROUP MEMBERSHIP

(75) Inventors: Christopher J. Seiler, Pleasant Grove, UT (US); Bryan Cardoza, Payson, UT (US); Bruce T. Cragun, Orem, UT (US); K. Michael Mahoney, Midway, UT (US)

(73) Assignee: Novell, Inc., Provo, UT (US)

( * ) Notice: Subject to any disclaimer, the term of this patent is extended or adjusted under 35 U.S.C. 154(b) by 497 days.

(21) Appl. No.: 10/251,572

(22) Filed: Sep. 20, 2002

(51) Int. Cl.
  *G06F 17/30* (2006.01)
(52) U.S. Cl. .................................................. 707/100
(58) Field of Classification Search .................... 707/1, 707/2, 5, 100; 709/206; 705/8
  See application file for complete search history.

(56) References Cited

U.S. PATENT DOCUMENTS

| | | | |
|---|---|---|---|
| 5,797,128 A * | 8/1998 | Birnbaum | 707/5 |
| 6,381,579 B1* | 4/2002 | Gervais et al. | 705/8 |
| 2002/0055989 A1* | 5/2002 | Stringer-Calvert et al. | 709/220 |
| 2002/0149601 A1* | 10/2002 | Rajarajan et al. | 345/619 |
| 2002/0184321 A1* | 12/2002 | Fishman et al. | 709/206 |
| 2003/0020749 A1* | 1/2003 | Abu-Hakima et al. | 345/752 |
| 2003/0050986 A1* | 3/2003 | Matthews et al. | 709/206 |
| 2003/0105771 A1* | 6/2003 | Tiefenbrun et al. | 707/103 R |
| 2003/0158897 A1 | 8/2003 | Ben-Natan | |

* cited by examiner

*Primary Examiner*—Etienne P. LeRoux
(74) *Attorney, Agent, or Firm*—Marger, Johnson, & McCollom, P.C.

(57) ABSTRACT

Membership in a group is defined, either manually or by rule. Items are distributed to the members of the group as the items are associated with the group. When a container hierarchy changes (by adding, removing, or changing the properties of an object), the object is checked to see if the change affects the group. If so, then items are re-distributed and/or recalled from the affected members of the group.

40 Claims, 9 Drawing Sheets

METHOD FOR DYNAMICALLY DISTRIBUTING ITEMS FOR CHANGES BASED ON GROUP MEMBERSHIP

FIELD OF THE INVENTION

This invention pertains to groups, and more particularly to delivering items to members of the group, even as the group is updated.

BACKGROUND OF THE INVENTION

The concept of groups predates the rise of computers. Circulation lists allowed groups of people to review a single object (typically a document), each in turn. Similarly, group calendars existed that could be marked up, letting everyone involved in the group be aware of things that were happening.

When computers entered the picture, delivery of information could be electronic rather than manual. Instead of each person looking over a physical copy of the object, an electronic copy could be circulated to every member at once. This saved time, as each member could look over the object simultaneously, instead of waiting for the previous person to finish with the object.

But the ability to circulate objects electronically is dependent on the group containing the correct members. As membership in the list fluctuates, the group has to be updated to reflect the changes in membership. And even with manual updating of the group, there is no provision for new members to be informed about past objects. And exiting members are left with the problem of manually correcting their personal databases to reflect changes.

For example, consider the situation in FIG. 1. Group 102 originally consists of three people: Aaron 105, Beth, 110, and Charlie 115. At some point, a meeting notice is sent to group 102, as shown by box 120. The meeting is scheduled in the members' timelines, as shown as meetings 125-1, 125-2, and 125-3.

Eventually, before the meeting occurs, Charlie 115 leaves group 102, as shown by box 130. And at some point, David 135 joins the group, as shown by box 140. Two problems arise because of these changes in group 102. First, the timeline for Charlie 115 still shows Charlie 115 as attending the meeting, even though Charlie is no longer part of the group (and so should not attend the meeting). Charlie 115 has to manually remove the meeting notice from his timeline, since he no longer needs to attend the meeting. Second, the timeline for David 135 does not show David 135 as needing to attend the meeting, even though he needs to attend. David 135 has to manually insert meeting 150 into his calendar.

A need remains for a way to provide access to group resources that addresses these and other problems associated with the prior art.

SUMMARY OF THE INVENTION

The invention is a method and apparatus for distributing items based on a group. When items are assigned to the group, the items are distributed to the members. If a new member is added to the group, the item is automatically re-distributed to the new member. If an existing member is removed from the group, then the item is automatically recalled from the departing member.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
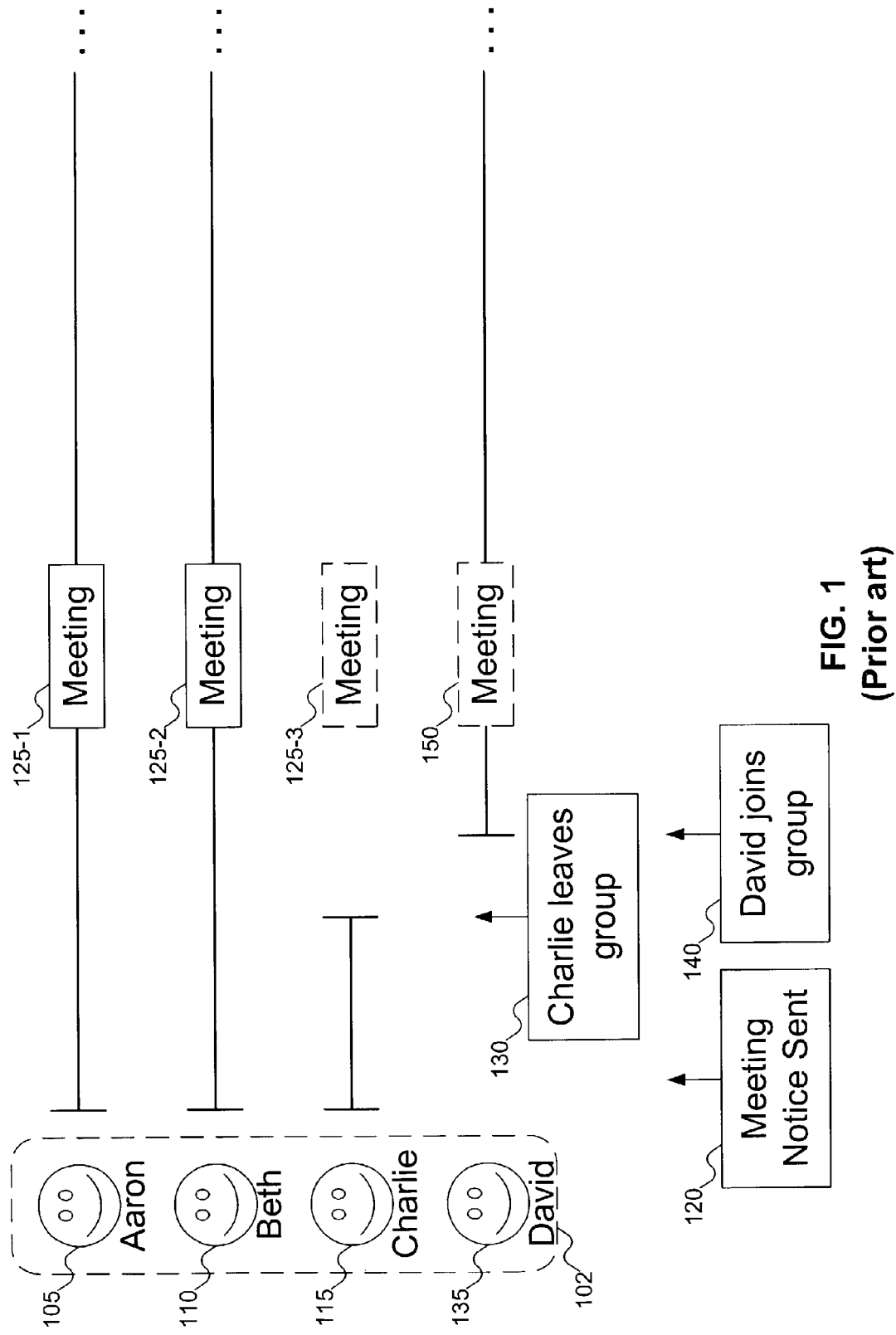
FIG. 1 illustrates the problem of distributing items to groups that change over time.
Figure 2:
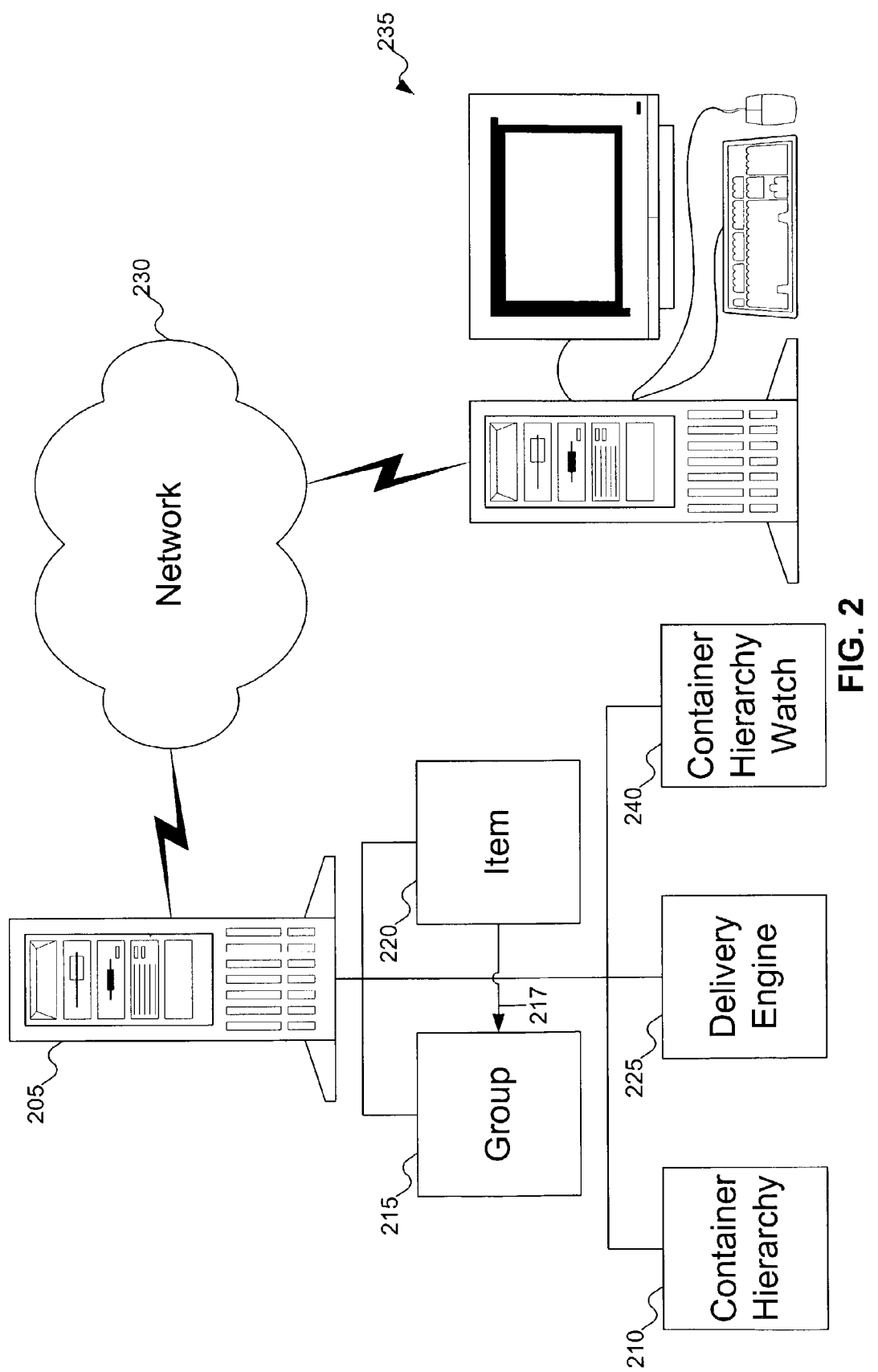
FIG. 2 shows a computer system for delivering items to a group that changes over time, according to an embodiment of the invention.

FIG. 2 shows a computer system for delivering items to a group that changes over time, according to an embodiment of the invention. In FIG. 2, server 205 includes container, hierarchy 210, group 215, item 220, and delivery engine 225. Container hierarchy 210 is used to store the hierarchy of objects (user objects, containers, and groups), and is discussed further with reference to FIG. 3 below. Group 215 identifies the individuals to whom item 220 is to be delivered, and is typically stored in container hierarchy 210. Item 220 is the item to be delivered to the members of the group. Note that item 220 is associated with group 215. The association, designated by arrow 217, lets server 205 know which items are to be delivered to which groups. (Arrow 217 is a graphic representation of the association, which can be represented internally to server 205 in a number of different ways: for example, by a pointer in the memory of server 205 from the item to the group, or vice versa.) Delivery engine 225 is responsible for delivering item 220 to the users identified by group 215. For example, delivery engine 225 can deliver the item across network 230 to computer system 235, assuming that one of the users in group 215 uses computer system 230.

When changes occur to group 215, other members of group 215 can be notified of the changes. For example, if a new member is added, the other members can be notified (e.g., by e-mail or other means) of the new member. In general, however, the system operates without specifically informing or affecting any individuals other than those directly affected by changes. When item 220 is posted to group 215, it is delivered to the members of group 215, and as the membership changes, the item is posted to new members or removed from exiting members. Members that are not affected by changes to group 215 are not informed about changes.

Although delivery engine 225 can simply e-mail item 220 to computer system 235, a person skilled in the art will recognize that other delivery mechanisms are possible. For example, when delivering a calendar item, delivery engine 225 can interface with a calendar program on computer system 235 and add the calendar entry automatically, obviating the need for the user to manually enter the calendar item. Or, both e-mail notice and calendar entries can be performed.

Server 205 also includes container hierarchy watch 240. Container hierarchy watch 240 is responsible for watching the container hierarchy for changes. When the container hierarchy changes (e.g., by adding a new object or deleting or changing an attribute of an existing object), container hierarchy watch 240 interfaces with group 215 and determines if the change affects group 215. If the change affects group 215, then container hierarchy watch 240 instructs delivery engine 225 to re-distribute item 220 to group 215, thereby ensuring that item 220 has been distributed to the current members of group 215. Container hierarchy watch 240 is discussed further below with reference to FIGS. 4A–4C.

Figure 3:
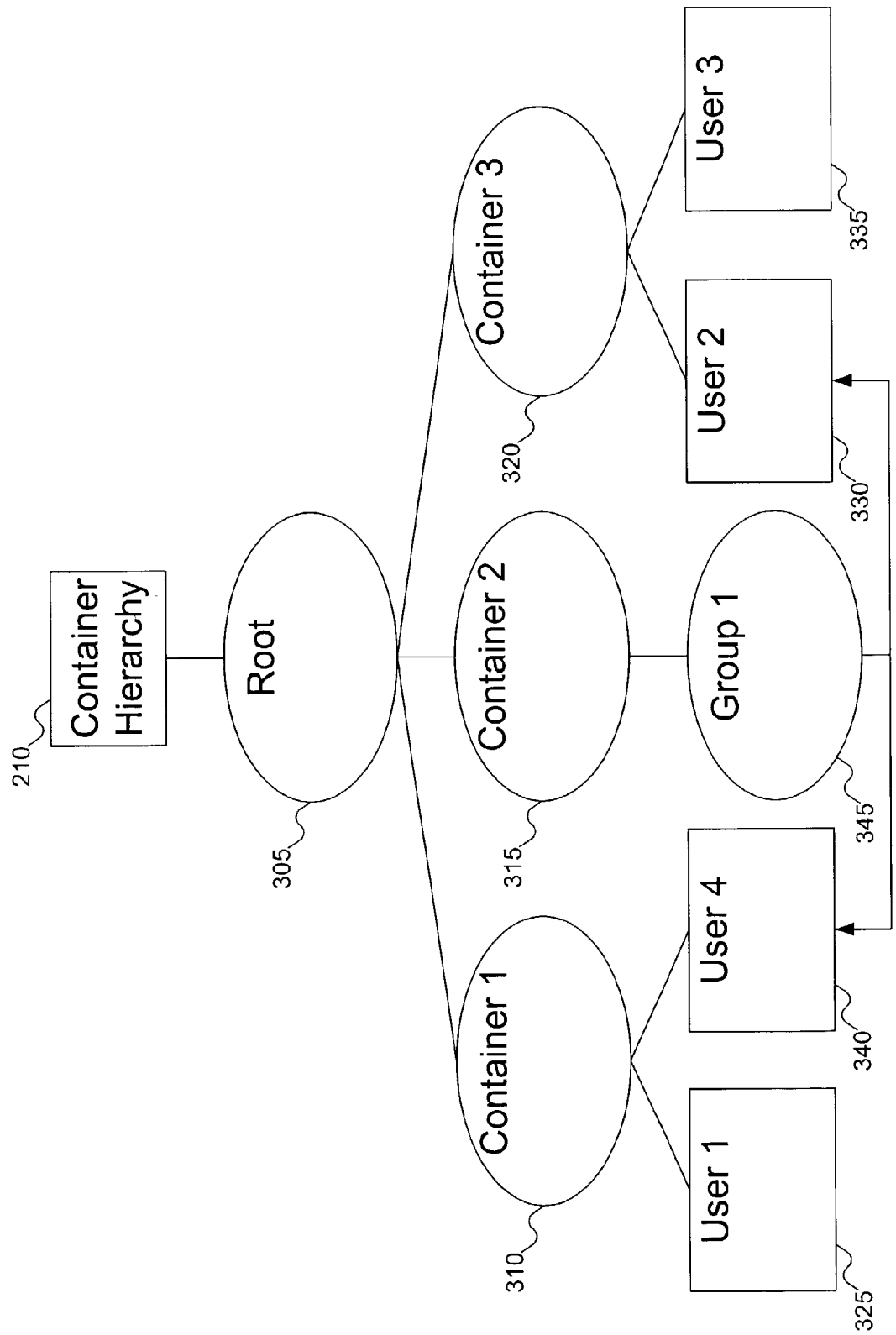
FIG. 3 shows an example of the structure of the container hierarchy of FIG. 2, according to an embodiment of the invention.

FIG. 3 shows an example of the structure of the container hierarchy of FIG. 2, according to an embodiment of the invention. In FIG. 3, root 305 is the root of a container hierarchy. There are three objects below root 305: container 1 (310), container 2 (315), and container 3 (320). Each of containers 1 (310), 2 (315), and 3 (320) can further contain objects in the container hierarchy (be they other containers, user objects, groups, or other types of objects). The containers can be organized in any desired fashion and to any purpose. A person skilled in the art will recognize that there are numerous variations on FIG. 3. For example, there can be fewer or more than three containers below root 305.

Containers 1 (310) and 3 (320) are expanded, to show directory entries for four individuals. Directory entry 325 is for user 1, directory entry 330 is for user 2, and directory entry 335 is for user 3, and directory entry 340 is for user 4. Although FIG. 3 shows two users in each of containers 1 (310) and 3 (320), a person skilled in the art will recognize that there can be any number of users in a container. In addition, a person skilled in the art will recognize that there can be more than three levels in container hierarchy 210.

FIG. 3 also shows group 1 (directory entry 345). A group represents a group of users not contained in a container in container hierarchy 210. Although group 1 (directory entry 345) contains two members, a person skilled in the art will recognize that a group can have any number of members.

FIG. 3 shows group 1 (directory entry 345) as having direct membership by users. A person skilled in the art will recognize that membership in a group can be direct membership or indirect membership based upon some criteria. The criteria can be anything, such as "users whose first names begin with the letter A," or "users who are managers," for example. Typically, the criteria are chosen by the person(s) setting up the group.

In another embodiment, groups can include containers as members. Where a container is included in the group, all the objects within that container are considered part of the group. For example, if group 1 (directory entry 345) were modified to include container 1 (310), then group 1 (directory entry 345) would include both users 1 (directory entry 325) and 4 (directory entry 340).

Figure 4A:
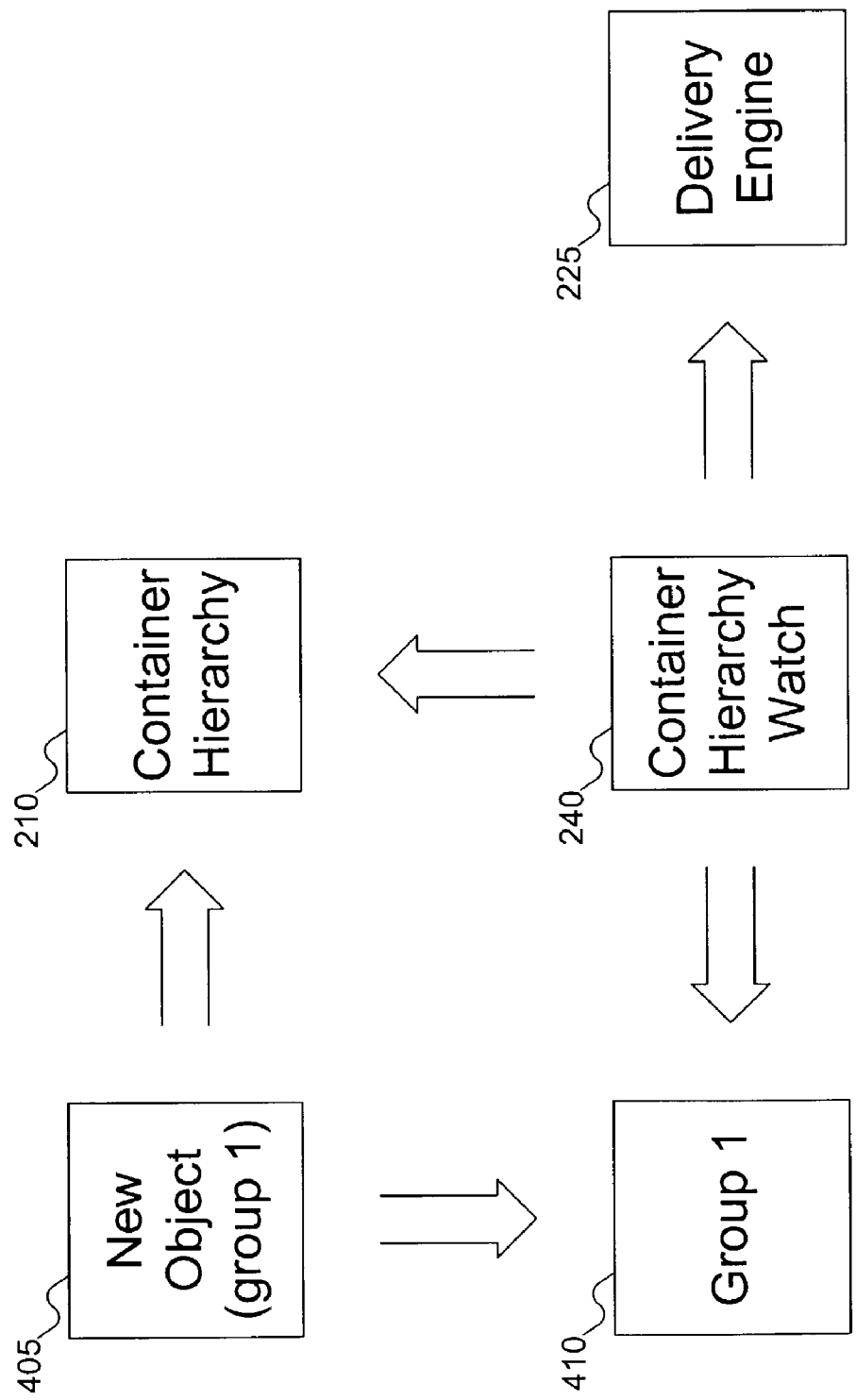
FIGS. 4A–4C show how the container hierarchy watch of FIG. 2 updates the group of FIG. 2 as changes are made to the container hierarchy of FIG. 2, according to an embodiment of the invention.
Figure 4B:
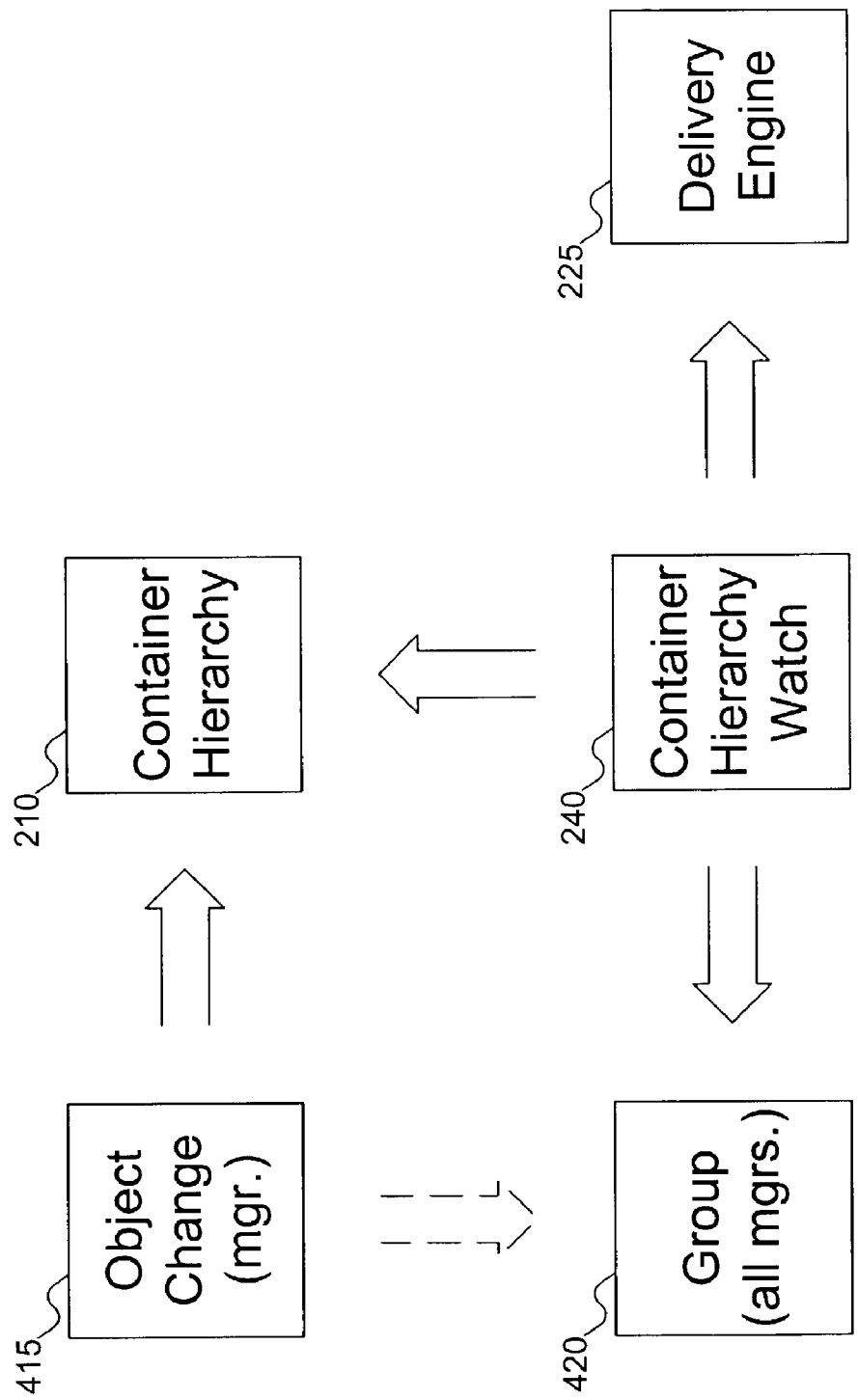
Figure 4C:
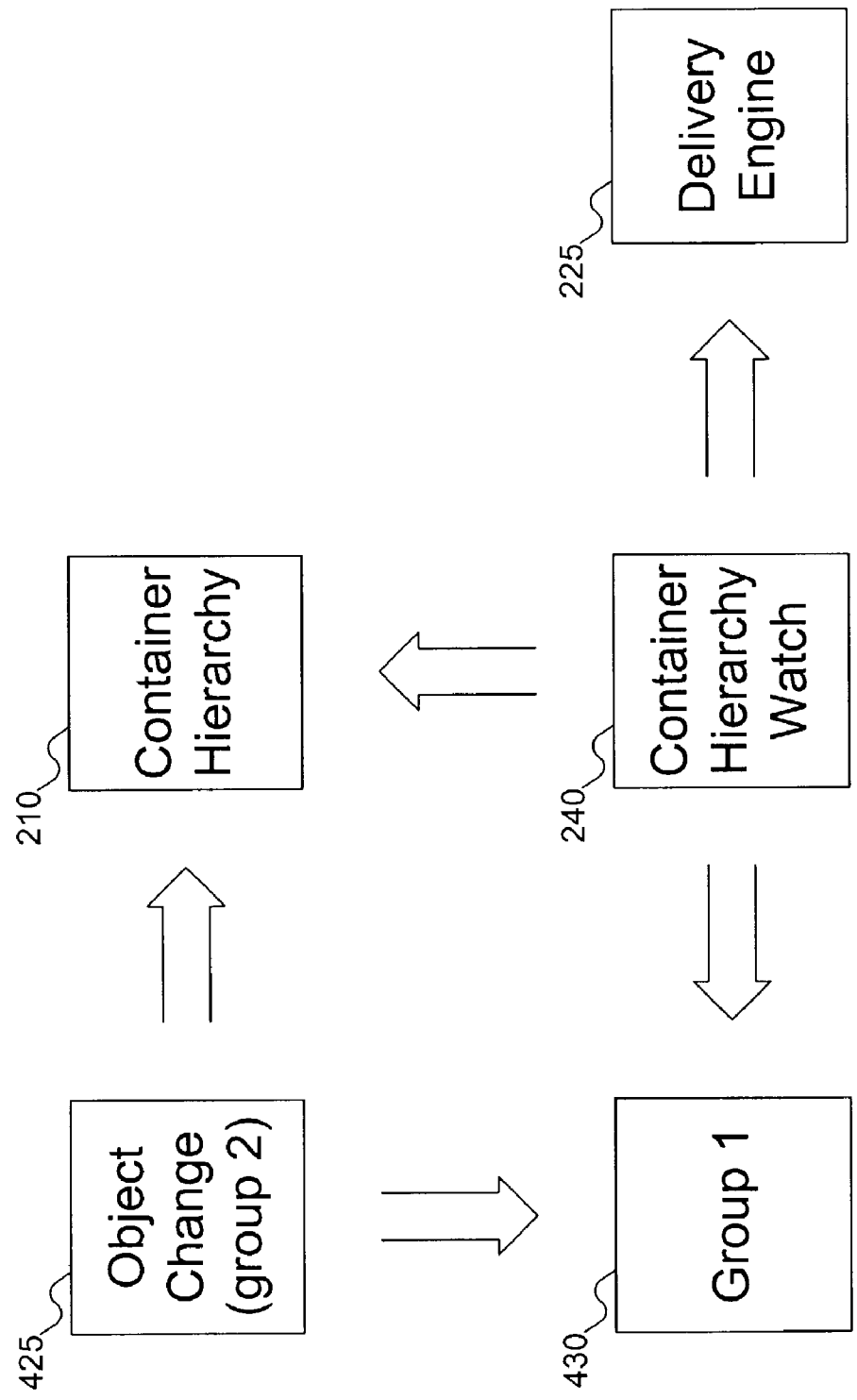

FIGS. 4A–4C show how the container hierarchy watch of FIG. 2 updates the group of FIG. 2 as changes are made to the container hierarchy of FIG. 2, according to an embodiment of the invention. In FIG. 4A, new object 405 is shown being added to container hierarchy 210. FIG. 4A also indicates that new object 405 is added to group 1 410. New object 405 can be added to group 1 410 manually (if group 1 410 is a direct list of members), or new object 405 can be added to group 1 410 automatically (if new object 405 should be added indirectly to group 1 410, for example by being added to a container included in group 1 410). As new object 405 is added to container hierarchy 210, container hierarchy watch 240 detects the change in container hierarchy 210. Since new object 405 is joining group 1 410, container hierarchy watch 240 detects the change and informs delivery engine 225 to alert the user represented by new object 405 to any items. A person skilled in the art will recognize that the user represented by new object 405 can be informed about only pending items (that is, items that are not yet complete), or can be informed about all items (even complete ones). By informing the user about all items, the user has access to the history of the group. By informing the user of only pending items, the user is shown only items that need to be finished. There are different advantages to each approach, which will not be detailed here.

In FIG. 4B, object 415 is shown having an attribute changed in container hierarchy 210. In this case, object 415 is being given a manager attribute (for example, as a promotion), but a person skilled in the art will recognize that other attributes can change, thereby affecting a user's group memberships. Since object 415 now has the manager attribute, container hierarchy watch 240 detects the change and notices that object 415 is to be added to group 420 (the group of managers). Container hierarchy watch 240 informs delivery engine 225 to alert the user represented by object 415 to any pending items for group 420.

In FIG. 4C, object 425 is having an attribute change in container hierarchy 210. FIG. 4C indicates that object 425 is being moved from group 1 430 to group 2. Since object 425 is no longer a member of group 1 430, container hierarchy watch 240 informs delivery engine 225 to recall any items from the user represented by object 425. This can include, for example, removing any scheduled meetings pertinent to only group 1 from the user's calendar and recalling any e-mails sent to the user as a member of the group, among other activities. Updates also include those pertaining to adding the member to group 2, as discussed above with reference to FIG. 4A.

Figure 5:
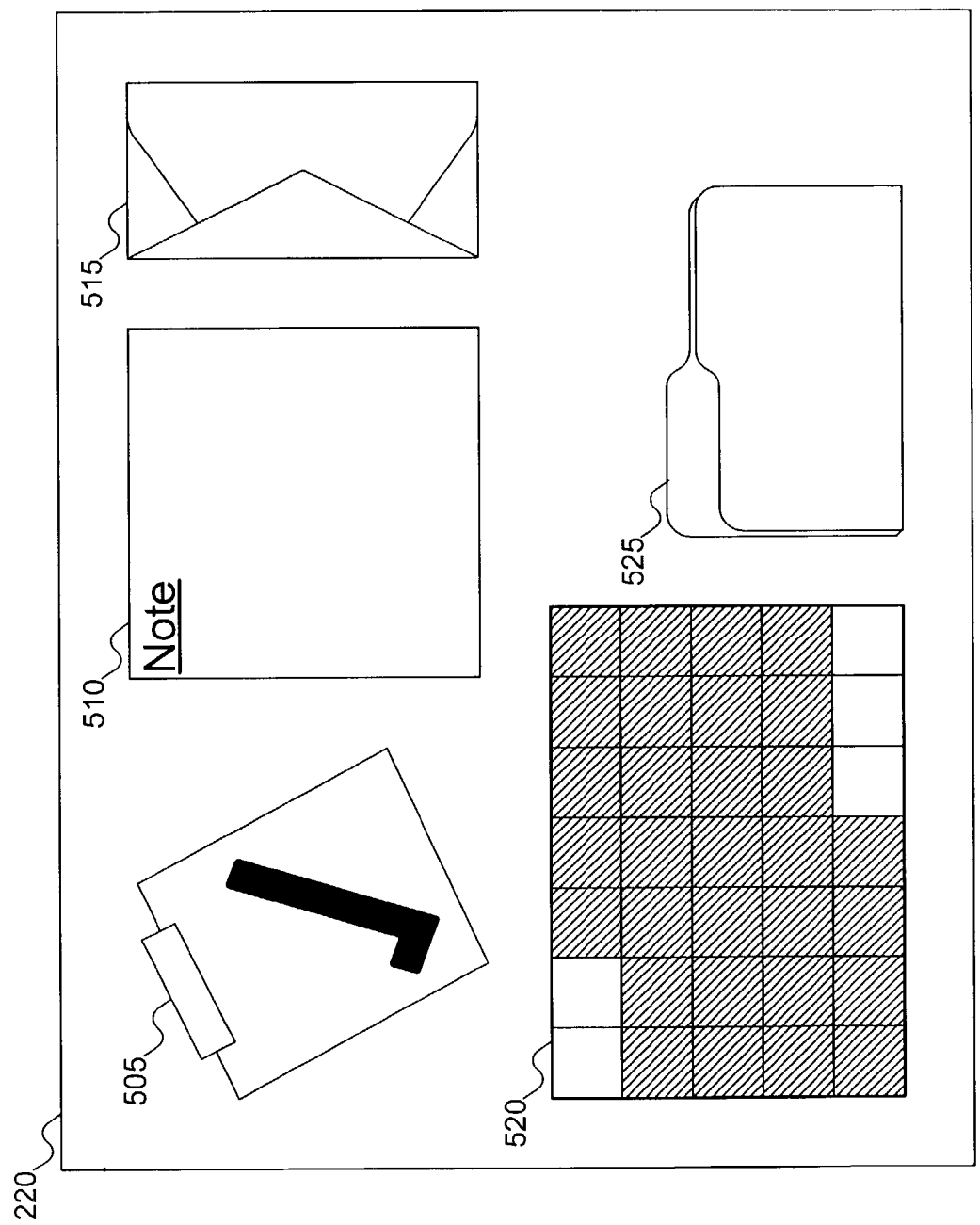
FIG. 5 shows examples of different types of items that can be distributed using the computer system of FIG. 2, according to an embodiment of the invention.

FIG. 5 shows examples of different types of items 220 that can be distributed using the computer system of FIG. 2, according to an embodiment of the invention. Some of the different types of items include:

Task 505 represents a task that can be assigned to one or more users. Tasks are goals that need to be accomplished. Tasks can be of any scope, ranging from very broad to very narrow.

Note 510 represents a note that is shown to the users. An example of a note is a reminder about a planned vacation, which alerts the other members of the group about the vacation by one user. Reminders about events like vacations are normally spread casually: note 510 allows for the reminder to be distributed electronically to everyone.

E-mail 515 represents an electronic message distributed to the group. E-mails are a way for users to share information and have discussions. By e-mailing the group, all members of the group can participate in the conversation. Unlike the other types of items, e-mails tend to have very short lives: once sent the e-mail is complete. If deleted, a normal e-mail is lost unless deliberately archived, and newcomers to the group cannot view normal e-mails unless someone deliberately searches for and forwards the e-mail to the newcomer. But by treating e-mail as an item in the present invention, new users are automatically given access to past e-mails and thereby be brought up to speed on communications within the group.

Calendar event 520 represents events that are scheduled to occur at a particular time. Such events can include, for example, scheduled meetings, planned product releases, timelines to test a product, and so on.

Folder 525 represents data files that belong to the group. By associating folder 525 with the group, access to the data in folder 525 can be limited to only current members of the group. Users who have left the group can be denied access to the group resources.

Figure 6A:
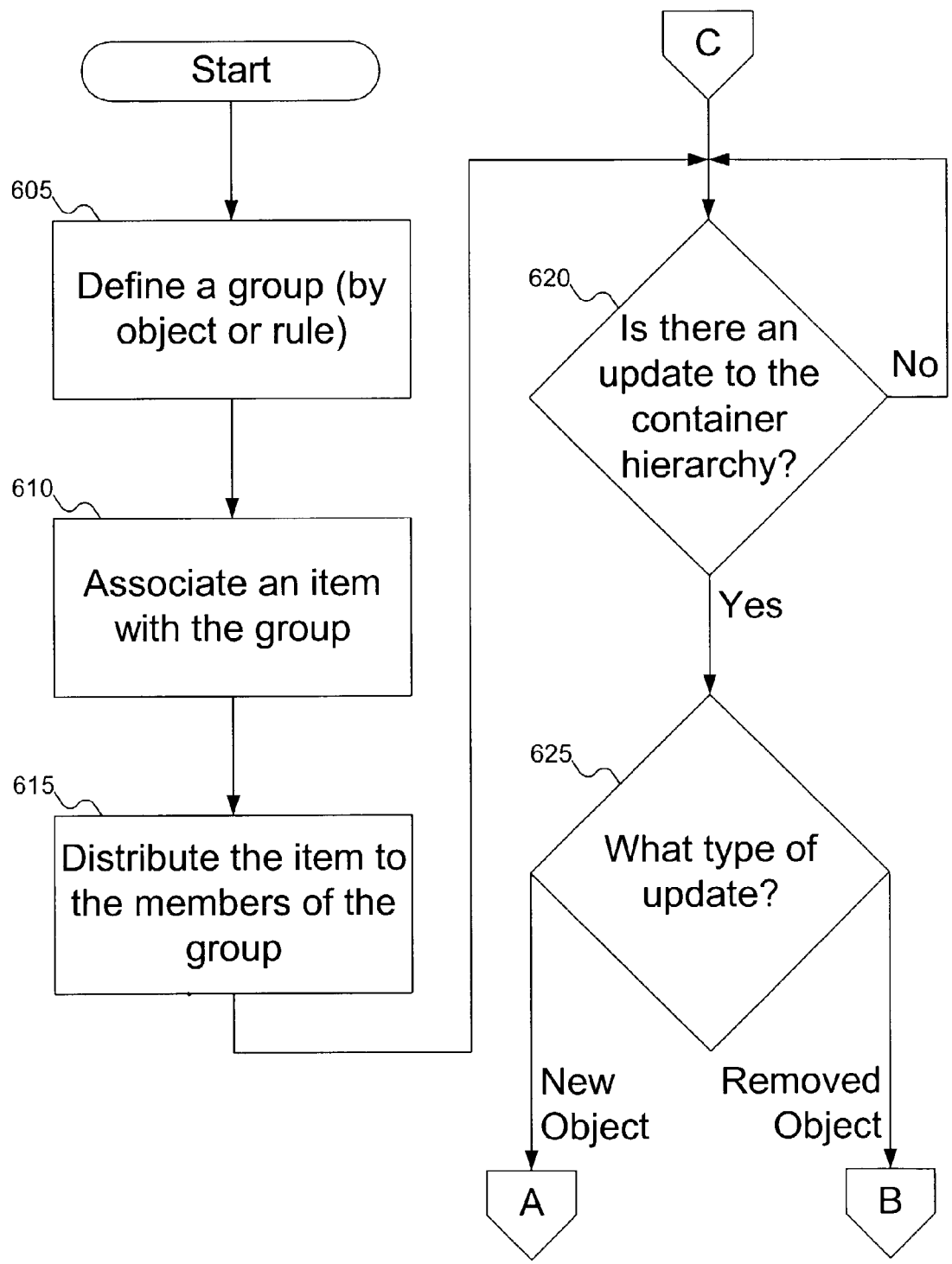
FIGS. 6A–6B show a flowchart of the procedure for distributing and re-distributing items to the group of FIG. 2 as the group changes, according to an embodiment of the invention.
Figure 6B:
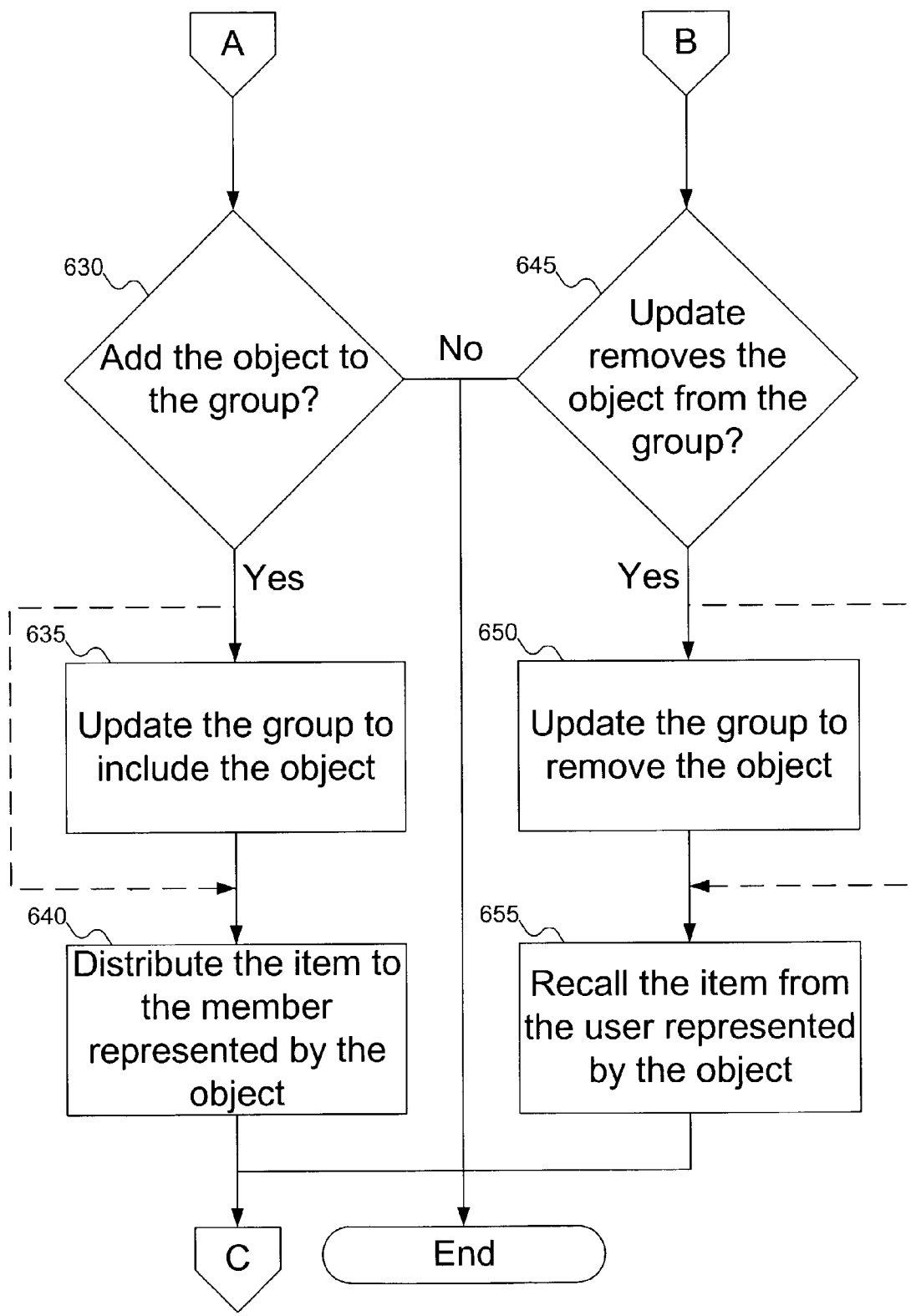

FIGS. 6A–6B show a flowchart of the procedure for distributing and re-distributing items to the group of FIG. 2 as the group changes, according to an embodiment of the invention. In FIG. 6A at step 605, a group is defined. As discussed above with reference to FIG. 3, group membership can be defined by directly linking each member with the group, or group membership can be defined indirectly based on an attribute of objects in the container hierarchy. At step 610, an item is associated with the group. At step 615, the item is distributed to the group members. At step 620, the container hierarchy watch watches the container hierarchy for any change that impacts the group. Once a change that impacts the group is detected, then at step 625 the type of update is determined. As discussed above with reference to FIGS. 4A–4C, there are two types that impact groups: new members joining the group (either by inserting new objects into the container hierarchy of by modifying the attributes of objects to add them to the group), and existing members leaving the group (either by removing the objects from the container hierarchy or by modifying the attributes of objects to remove them from the group). Note that modifying attributes of objects can both add and remove objects from groups: when an object's attributes are modified, both paths are followed.

At step 630 (FIG. 6B), the process for checking to see if an object is added to a group is begun. Step 630 checks to see if the object is to be added to the group. If so, then at step 635 the object is added to the group. As discussed above, this can be done manually for direct membership groups. For indirect membership groups, this step can be omitted or bypassed. For example, where the group is defined to include all managers, the object will be picked up automatically because the object includes the "manager" attribute. Finally, at step 640, the item is distributed to the user represented by the object. A person skilled in the art will recognize that this distribution is not limited to the item associated with the group at step 610 (FIG. 6A), but rather typically includes some (e.g., pending) or all items associated with the group.

At step 645, the process for checking to see if an object is removed from a group is begun. Step 645 checks to see if the object is to be removed from the group. If so, then at step 650 the object is removed from the group. As discussed above, this can be done manually for direct membership groups. For indirect membership groups, this step can be omitted or bypassed. For example, where the group is defined to include all managers, the object will be excluded automatically because the object lacks the "manager" attribute. Finally, at step 655 the item is recalled from the user represented by the object. A person skilled in the art will recognize that this is not limited to the item associated with the group at step 610 (FIG. 6A), but rather typically includes all items associated with the group.

A person skilled in the art will recognize that an embodiment of the invention described above can be implemented using a computer. In that case, the method is embodied as instructions that comprise a program (in this case, instructing a central processing unit how to execute other programs). The program may be stored on computer-readable media, such as floppy disks, optical disks (such as compact discs), fixed disks (such as hard drives), random access memory (RAM), read-only memory (ROM), or flash memory. The program can then be executed on a computer to implement the method. A person skilled in the art will also recognize that an embodiment of the invention described above can include a computer-readable modulated carrier signal, and that the program, or portions of its execution, can be distributed over multiple computers in a network.

Having illustrated and described the principles of the invention in an embodiment thereof, it should be readily apparent to those skilled in the art that the invention can be modified in arrangement and detail without departing from such principles. All modifications coming within the spirit and scope of the accompanying claims are claimed.

The invention claimed is:

1. An apparatus for distributing changes based on a group, the apparatus comprising:
   a computer including a storage, the storage including:
   a container hierarchy representing an hierarchical organization of objects, wherein objects can be added to and removed from the container hierarchy;
   an object representing at least one user, the object included in the container hierarchy;
   a group including at least the object;
   a plurality of items associated with the group;
   a delivery engine operative to distribute the items to the users represented by objects in the group, to re-distribute the items responsive to changes in the group, and to notify the users represented by objects in the group of a change in the group;
   a container hierarchy watch designed to detect a change in the container hierarchy and notify the delivery engine of the change in the container hierarchy;
   means for removing an old member from the group to define a second group; and
   means for recalling the plurality of items from the old member after the plurality of items were distributed to the old member from the group while preserving the plurality of items for remaining members in the second group.

2. An apparatus according to claim 1, wherein the container hierarchy watch is operative to detect a second object added to the group responsive to a third object added to the container hierarchy.

3. An apparatus according to claim 2, wherein the delivery engine is operative to distribute the items to the users represented by the second object.

4. An apparatus according to claim 1, wherein the container hierarchy watch is operative to detect the object as removed from the group responsive to the object being removed from the container hierarchy.

5. An apparatus according to claim 4, wherein the delivery engine is operative to recall the items from the users represented by the object after the items have been delivered to the users and after the object has been removed from the group.

6. An apparatus according to claim 1, wherein the container hierarchy watch is operative to detect a changed attribute of the object and remove the object from the container hierarchy responsive to the changed attribute.

7. An apparatus according to claim 6, wherein the delivery engine is operative to recall the items from the users represented by the object after the items have been delivered to the users and after the object has been removed from the group.

8. An apparatus according to claim 1, wherein the group includes a rule based on attributes of objects in the container hierarchy governing which objects in the container hierarchy are included in the group.

9. A computer-implemented method for distributing changes based on a group in a container hierarchy, wherein members of a group can be added and removed from the container hierarchy, comprising:
   associating a first item to a group, the group including a first set of one or more members;
   associating a second item to the group;
   distributing the first item and the second item to the first set of members of the group;
   dynamically updating the group to include a second set of one or more members, including removing an old member from the first set of members to define the second set of members;
   re-distributing the first item and the second item to the second set of members of the group, including recalling the first item and the second item from the old member after the first item and the second item were distributed to the old member from the first set of members while preserving the first item and the second item for remaining members in the second set of members; and
   notifying the second set of members of the group of the update.

10. A computer-implemented method according to claim 9, wherein:
    dynamically updating the group includes adding a new member to the first set of members to define the second set of members; and
    re-distributing the first item and the second item includes distributing the first item and the second item to the new member.

11. A computer-implemented method according to claim 9, wherein:
    associating a first item includes associating a task to the group; and
    recalling the first item includes removing the task from a task list of the old member.

12. A computer-implemented method according to claim 9, wherein:
    associating a first item includes associating the first item to the group, the first item drawn from a set including an appointment and a calendar note; and
    recalling the first item includes removing the first item from a calendar of the old member.

13. A computer-implemented method according to claim 9, wherein:
    associating a first item includes associating the first item to the group, the first item drawn from a set including an e-mail and a data; and
    recalling the first item includes blocking access to the first item by the old member.

14. A computer-implemented method according to claim 9, wherein associating a first item includes associating the first item to the group, the first item drawn from a set including a task, an appointment, a calendar note, an e-mail, and a data.

15. A computer-implemented method according to claim 9, wherein dynamically updating the group includes dynamically updating the group when a change is made to the container hierarchy.

16. A computer-implemented method according to claim 15, wherein dynamically updating the group when a change is made to the container hierarchy includes:
    receiving an indication that a new member has been added to the container hierarchy;
    determining if the new member is to be added to the group; and
    adding the new member to the group.

17. A computer-implemented method according to claim 15, wherein dynamically updating the group when a change is made to the container hierarchy includes:
    receiving an indication that an existing member has been removed from the container hierarchy;
    determining if the existing member is in the group; and
    removing the existing member from the group.

18. A computer-implemented method according to claim 15, wherein dynamically updating the group when a change is made to the container hierarchy includes:
    receiving an indication that an attribute of an existing member has changed within the container hierarchy;
    determining if the existing member is to be removed from the group; and
    removing the existing member from the group.

19. A computer-implemented method according to claim 9, further comprising defining the group.

20. A computer-implemented method according to claim 19, wherein defining the group includes identifying each member in the first set of members as belonging in the group.

21. A computer-implemented method according to claim 19, wherein defining the group includes identifying the first set of members according to a rule.

22. A computer-implemented method according to claim 9, wherein re-distributing the first item includes re-distributing the first item to the second set of members of the group if the first item is still valid.

23. A computer-implemented method according to claim 9, wherein:
    associating a first item includes associating the first item to the group, the first item drawn from a set including an e-mail and a data; and
    recalling the first item includes blocking access to the first item by the old member.

24. Computer-readable media containing a program to distribute changes based on a group in a container hierarchy, wherein members of a group can be added and removed from the container hierarchy, comprising:
    software to associate a first item to a group, the group including a first set of one or more members;
    software to associate a second item to the group;
    software to distribute the first item and the second item to the first set of members of the group;
    software to dynamically update the group to include a second set of one or more members, including software to remove an old member from the first set of members to define the second set of members;
    software to re-distribute the first item and the second item to the second set of members of the group, including software to recall the first item and the second item from the old member after the first item and the second item were distributed to the old member from the first set of members while preserving the first item and the second item for remaining members in the second set of members; and
    software to notify the second set of members of the group of the update.

25. Computer-readable media containing a program according to claim 24, wherein:

the software to dynamically update the group includes software to add a new member to the first set of members to define the second set of members; and the software to re-distribute the first item and the second item includes software to distribute the first item and the second item to the new member.

26. Computer-readable media containing a program according to claim 24, wherein:

the software to associate a first item includes software to associate a task to the group; and the software to recall the first item includes software to remove the task from a task list of the old member.

27. Computer-readable media containing a program according to claim 24, wherein:

the software to associate a first item includes software to associate the first item to the group, the item drawn from a set including an appointment and a calendar note; and the software to recall the first item includes software to remove the first item from a calendar of the old member.

28. Computer-readable media containing a program according to claim 24, wherein:

the software to associate a first item includes software to associate the first item to the group, the item drawn from a set including an e-mail and a data; and the software to recall the first item includes software to block access to the first item by the old member.

29. Computer-readable media containing a program according to claim 24, wherein the software to associate a first item includes software to associate the first item to the group, the first item drawn from a set including a task, an appointment, a calendar note, an e-mail, and a data.

30. Computer-readable media containing a program according to claim 24, wherein the software to dynamically update the group includes software to dynamically update the group when a change is made to the container hierarchy.

31. Computer-readable media containing a program according to claim 30, wherein the software to dynamically update the group when a change is made to the container hierarchy includes:

software to receive an indication that a new member has been added to the container hierarchy;

software to determine if the new member is to be added to the group; and software to add the new member to the group.

32. Computer-readable media containing a program according to claim 30, wherein the software to dynamically update the group when a change is made to the container hierarchy includes:

software to receive an indication that an existing member has been removed from the container hierarchy;

software to determine if the existing member is in the group; and software to remove the existing member from the group.

33. Computer-readable media containing a program according to claim 30, wherein the software to dynamically update the group when a change is made to the container hierarchy includes:

software to receive an indication that an attribute of an existing member has changed within the container hierarchy;

software to determine if the existing member is to be removed from the group; and software to remove the existing member from the group.

34. Computer-readable media containing a program according to claim 24, further comprising software to define the group.

35. Computer-readable media containing a program according to claim 34, wherein the software to define the group includes software to identify each member in the first set of members as belonging in the group.

36. Computer-readable media containing a program according to claim 34, wherein the software to define the group includes software to identify the first set of members according to a rule.

37. Computer-readable media containing a program according to claim 24, wherein the software to re-distribute includes software to re-distribute the first item to the second set of members of the group if the first item is still valid.

38. A computer-implemented method for distributing changes based on a group in a container hierarchy, wherein members can be added and removed from the group, comprising:

associating a first item to a group, the group including one or more members;

associating a second item to the group;

distributing the first item and the second item to the members of the group;

removing an old member from the group;

recalling the first item and the second item from the old member while preserving the first item and the second item for remaining members of the group; and notifying the remaining members of the group of the update.

39. A computer-implemented method according to claim 38, wherein:

associating a first item includes associating the first item to the group, the first item drawn from a set including an appointment and a calendar note; and recalling the first item includes removing the first item from a calendar of the old member.

40. A computer-implemented method according to claim 38, wherein:

associating a first item includes associating the first item to the group, the first item drawn from a set including an e-mail and a data; and recalling the first item includes blocking access to the first item by the old member.

* * * * *